United States Patent [19]
Wilkinson

[11] Patent Number: 6,055,339
[45] Date of Patent: Apr. 25, 2000

[54] VIDEO DATA COMPRESSION

[75] Inventor: James Hedley Wilkinson, Tadley, United Kingdom

[73] Assignee: Sony United Kingdom Limited, Weybridge, United Kingdom

[21] Appl. No.: 08/094,895

[22] Filed: Jul. 22, 1993

[30] Foreign Application Priority Data

Sep. 17, 1992 [GB] United Kingdom .................. 9219716

[51] Int. Cl.$^7$ ..................................................... G06K 9/38
[52] U.S. Cl. ............................................ 382/251; 348/405
[58] Field of Search ............................. 382/56, 232, 239, 382/251; 348/396, 398, 405, 406, 484, 394, 419, 424, 420, 433, 438

[56] References Cited

U.S. PATENT DOCUMENTS

| | | | |
|---|---|---|---|
| 4,780,761 | 10/1988 | Daly et al. ............................. | 358/133 |
| 5,214,502 | 5/1993 | Stone et al. ............................. | 348/398 |
| 5,268,905 | 12/1993 | Soloff et al. ............................. | 370/123 |
| 5,291,282 | 3/1994 | Nakagawa et al. ...................... | 348/384 |

FOREIGN PATENT DOCUMENTS 2 251 756 7/1992 United Kingdom ........... H04K 11/04

*Primary Examiner*—Matthew Bella
*Attorney, Agent, or Firm*—Frommer Lawrence & Haug, LLP.; William S. Frommer

[57] ABSTRACT

A video data compression system is described utilizing frequency separation and quantization. The video data is separated into primary frequency components (components 4, 5, 6) and secondary frequency components (components 0, 1, 2, 3). The primary frequency components undergo fewer frequency separating stages (N>M) than the secondary frequency components. The quantization step width ($Q_1$, $Q_2$) applied to the differing primary and secondary components is varied in dependence upon the relative human visual responsiveness ($R(f_s)$) to the spatial frequency ($f_s$) represented by that component. In addition, those frequency components that have undergone fewer frequency separating stages are subject to a larger quantization step width than the other frequency components since the fewer frequency combination stages such frequency components will subsequently undergo has the result that the image degradation introduced by quantization is less noticeable. The system also includes entropy encoding (42) using selectable complementary encoding and decoding tables. The system is particularly applicable to recording and reproducing apparatus.

28 Claims, 7 Drawing Sheets

VIDEO DATA COMPRESSION

BACKGROUND OF THE INVENTION

1. Field of the Invention

This invention relates to the field of video data compression. More particularly, this invention relates to the field of video data compression in which frequency separation and quantization are used.

2. Description of the Prior Art

British Published Patent Application GB-A-2 251 756 (Sony Broadcast & Communications Limited) describes a system using sub band frequency separation and quantization as part of a data compression process. Sub band frequency separation is used to decorrelate the video data into spatial frequency components of uniform size within the two-dimensional spatial frequency domain. The spatial frequency component data is then subject to a quantization process whereby the data representing the spatial frequencies to which the human visual system is less receptive is quantized more heavily than other spatial frequency component data. The degree of quantization applied to each spatial frequency component is chosen to follow an empirically determined relationship between relative human visual responsiveness at differing spatial frequencies. In general, the lower spatial frequency components are less heavily quantized than the higher spatial frequency components.

Another video data compression system is described in IEEE Transactions on Circuits and Systems for Video Technology, Volume 1, No. 2, June 1991, pages 174 to 183, "Sub band Coding Algorithms for Video Application: Videophone to HDTV-Conferencing" by Hamid Gharavi. In contrast to the above, a video compression system is disclosed which separates the data into sub band components in the two-dimensional spatial frequency domain of non-uniform size. This form of frequency separation is also known as "wavelet" coding. The frequency separated data is passed via a quantizer to a buffer store. The buffer store is continuously loaded with the compressed data and continuously emptied as the data is read for transmission. The degree of quantization is controlled based upon the spare capacity within the buffer store so as to avoid a disadvantageous overflow or underflow of the buffer store.

A constant aim within video data compression systems is to achieve a higher degree of data compression with a reduced degree of degradation in image quality upon decompression. Generally speaking, the higher the degree of compression used, the greater will be the degradation in the image when it is decompressed. More specifically, higher degrees of compression can be achieved by using heavier quantization (i.e. larger quantization step widths), but quantization is a non-reversible process and heavier quantization will result in an increase in degradation in the image when it is decompressed.

SUMMARY OF THE INVENTION

Viewed from one aspect this invention provides video data compression apparatus comprising:

(i) means for frequency separating input video data into one or more primary components, each representing a range of spatial frequency content within said input video data, using M frequency separating stages and a plurality of secondary components, each representing a range of spatial frequency content within said input video data, using N frequency separating stages, N being greater than M; and (ii) a quantizer for quantizing each of said primary components with a primary quantization step width $Q_1$ and for quantizing each of said secondary components with a secondary quantization step width $Q_2$, where $Q_1$ and $Q_2$ are substantially given by:

$$Q_1 = K_1/R(f_1) \text{ and } Q_2 = K_2/R(f_2),$$

with $R(f_s)$=relative human visual responsiveness at differing spatial frequencies $f_s$, $f_s$=spatial frequency in cycle per degree of visual angle, $f_1$=a spatial frequency representative of that primary component being quantized, $f_2$=a spatial frequency representative of that secondary component being quantized, and $K_1$ and $K_2$ are constants with $K_1 > K_2$.

This invention both recognises and exploits that the perceivable degradation in an image due to an error (e.g. a deviation from the true value caused by quantization) is dependent upon the number of stages of interpolation to which that error is subjected to produce the decompressed image in the spatial domain. A stage of interpolation can be considered to be the operation of frequency separating the data in both the horizontal and vertical directions. In the case of 64 sub band components of equal size, as disclosed in GB-A-2 251 756, each sub band component is subject to three frequency combinations (interpolation) stages (three horizontal and three vertical) to transform it back into the spatial domain. In each of these stages, any error present will be spread further in the reconstructed image.

In the case of frequency separation in which different frequency components have undergone a different number of stages of separation, and will therefore require a different number of stages of combination, the effect of a particular error in a given component will vary in a manner that can be exploited to achieve better overall compression. More particularly, those frequency components that will be subject to fewer stages of combination can be more heavily quantized relative to those that will be subject to more stages of combination. In practice, the degree of quantization is already varied between different frequency components, as described in GB-A-2 251 756, and this variation of quantization between frequency components is modified further to take into account the relative number of combination stages to which each frequency component will be subjected.

In GB-A-2 251 756, the variation of quantization between frequency components is inversely proportional to the relative human visual responsiveness at the spatial frequency characteristic of that frequency component. In embodiments of the present invention, this relationship is modified such that the quantization is proportional to respective constants $K_1$ and $K_2$, with $K_1 > K_2$ depending upon the number of frequency separating stages, and consequently frequency combination stages, that the particular frequency component has undergone.

The invention allows an improvement in the decompressed image quality for a given degree of compression or, alternatively, an improvement in the degree of compression for a given degree of quality in the decompressed image.

It is known to provide video compression systems in which frequency separation and quantization are combined with entropy encoding, e.g. runlength coding followed by Huffman coding. In preferred embodiments of the invention there is provided an entropy encoder for entropy encoding quantized primary and secondary component data output from said quantizer with a selectable one of a plurality of encoding tables.

Matching the particular entropy coding table being used to the frequency component being processed allows an advantageous increase in the degree of compression that can be achieved.

The means for frequency separating input video data could take a number of forms. However, it is particularly convenient if said secondary components are produced by further separating one or more primary components.

It will be appreciated that the relative human visual responsiveness $R(f_s)$ at differing spatial frequencies $f_s$ is an empirically determined quantity measured over a plurality of tests subjects. However, in preferred embodiments of the invention good results have been achieved when $R(f_s)$ is substantially given by:

$$R(f_s)=a*(1-e^{-b.fs})*(e^{-c.fs}+(0.33*e^{-0.33\ c.fs}))$$

with 0.8<a<1.2, 1.4<b<1.8, and 0.3<c<0.5.

The above human responsiveness $R(f_s)$ is particularly suited for use upon luminance video data and when a=1.0, b=1.6 and c=0.4.

As one alternative, good results are also achieved when $R(f_s)$ is substantially given by:

$$R(f_s)=a*(1-e^{-b.fs})*e^{-c.fs},$$

with 1.15<a<1.55, 1.4<b<1.8, and 0.25<c<0.45.

This alternative is particularly suited for use upon blue colour difference chrominance video data and when a=1.35, b=1.6 and c=0.35.

As another alternative, good results are also achieved when $R(f_s)$ is substantially given by:

$$R(f_s)=a*(1-e^{-b.fs})*e^{-c.fs},$$

with 1.5<a<1.9, 1.4<b<1.8, and 0.5<c<0.7.

This alternative is particularly suited for use upon red colour difference chrominance video data when a=1.7, b=1.6 and c=0.6.

The human eye is less responsive to blue colour difference signal than to red colour difference and luminance signals. This can be exploited by more heavily quantizing the blue colour difference signals to yield greater compression without an undue degradation in image quality upon decompression. However, in some systems it may be desired to use the blue colour difference signal, or the information content thereof, for some process other than direct display for human viewing, e.g. downstream chroma-keying. In this case it is desirable to preserve the blue colour difference resolution to above that otherwise justified by its relative human visual responsiveness.

It will be seen from the above, that this compression technique can be used to compress either or both luminance video data and chrominance video data in which case, the appropriate ones of the above relationships between human visual responsiveness and spatial frequency are used.

Whilst the number of frequency separating stages M and N can vary, it has been found desirable that M=1 and N=2.

In practice, each frequency separation and interpolation stage will introduce an error and so an advantageous balance between improved decorrelation and the number of stages involved is reached when M=1 and N=2.

As explained above, the frequency components that are subject to fewer frequency separation, and subsequent frequency combination, stages may be more heavily quantized than would otherwise be expected.

It has been found particularly appropriate to use embodiments in which $K_1/K_2$ is substantially equal to 2.

As explained above, the number of primary and secondary components can vary, but in preferred embodiments it has been found convenient that said means for frequency separating separates said input video data into three primary components representing a high spatial frequency portion of said video data and four secondary components representing a low spatial frequency portion of said video data.

It will also be appreciated that other components in addition to the primary and secondary components may be present, e.g. in a three stage "wavelet" coding there will be primary, secondary and tertiary components. The significance of the technique is based upon the relative quantization of components subject to different degrees of separation.

In order to prevent the extra frequency separation stages undergone by the secondary components from resulting in an increase in the amount of data in the spatial frequency domain said primary components are of a higher spatial resolution than said secondary components.

In the preferred embodiment using three primary components and four secondary components it is convenient to provide that said primary components have a spatial resolution twice that of said secondary components.

As previously mentioned, it will be appreciated that the means for separating could be formed in a number of different ways. However, in preferred embodiments it is convenient that said means for separating comprises a branching hierarchy of low and high pass filters. Such filters can provide so called 'perfect' reconstruction in the manner described in copending British Patent Application 9111782.0 (Sony Broadcast & Communications Limited).

An effective way of forming low and high pass filters is to provide that said low and high pass filters comprise complementary finite impulse response filters.

Viewed from another aspect this invention also provides video data decompression apparatus comprising:

(i) a dequantizer for dequantizing each of one or more primary components, each representing a range of spatial frequency content within said input video data, with a primary dequantization step width $Q_1$ and dequantizing each of a plurality of secondary spatial frequency components, each representing a range of spatial frequency content within said input video data, with a secondary dequantization step width $Q_2$, where $Q_1$ and $Q_2$ are substantially given by:

$$Q_1=K_1/R(f_1) \text{ and } Q_2=K_2/R(f_2),$$

with $R(f_s)$ relative human visual responsiveness at differing spatial frequencies $f_s$, $f_s$=spatial frequency in cycle per degree of visual angle, $f_s$=a spatial frequency representative of that primary component being quantized, $f_2$=a spatial frequency representative of that secondary component being quantized, and $K_1$ and $K_2$ are constants with $K_1>K_2$; and (ii) means for frequency combining said dequantized primary components with M frequency combining stages and said dequantized secondary components with N frequency combining stages, N being greater than M. 21

As previously mentioned, the overall performance of the system is improved if entropy coding is used. Accordingly, the decompression apparatus advantageously includes an entropy decoder for entropy decoding compressed data into said quantized primary components and said quantized secondary components with a selectable one of a plurality of decoding tables.

In this way encoding, and complementary decoding, tables can be made to match the particular components being processed.

It will be appreciated that the video data compression and decompression apparatus of the invention can be used in various different contexts. In particular, video data compression and decompression has application to fields such as point to point transmission and video conferencing. However, this invention has particular application to a video data recording and reproducing apparatus in which improved data compression is needed in order to increase the running time of the storage medium whilst not unduly degrading the image quality.

In such a recording and reproducing apparatus, it is usual for some data losses to occur due to imperfections in the recording medium and the like. In such a circumstance, the visible effect of these errors can be reduced by preferred embodiments comprising:

multichannel recording and reproducing heads;

a demultiplexer for splitting adjacent samples within each of said primary components and said secondary components between different recording channels; and a multiplexer for combining samples from different reproducing channels to reform each of said primary and said secondary components.

The combination of demultiplexing adjacent samples within the components and the fact that the components are in the spatial frequency domain rather than the spatial domain (i.e. demultiplexing after wavelet coding) has the effect of retaining coding efficiency whilst reducing the visibility of the results of any errors should these occur.

In order to assist in the reproduction of an image in circumstances, such as shuttle, in which only part of the data is recovered, it is advantageous to provide a formatter for formatting said compressed data in blocks of data each containing a header identifying a spatial frequency domain position to which compressed data within said block relates. These data blocks can be made further independent by providing that each block includes error correction data for that block.

Viewed from a further aspect this invention also provides a method of compressing video data comprising the steps of:

(i) frequency separating input video data into one or more primary components, each representing a range of spatial frequency content within said input video data, using M frequency separating stages and a plurality of secondary components, each representing a range of spatial frequency content within said input video data, using N frequency separating stages, N being greater than M; and (ii) quantizing each of said primary components with a primary quantization step width $Q_1$ and for quantizing each of said secondary components with a secondary quantization step width $Q_2$, where $Q_1$ and $Q_2$ are substantially given by:

$$Q_1 = K_1/R(f_1) \text{ and } Q_2 = K_2/R(f_2),$$

with $R(f_s)$=relative human visual responsiveness at differing spatial frequencies $f_s$, $f_s$=spatial frequency in cycle per degree of visual angle, $f_1$=a spatial frequency representative of that primary component being quantized, $f_2$=a spatial frequency representative of that secondary component being quantized, and $K_1$ and $K_2$ are constants with $K_1 > K_2$.

Viewed from a still further aspect this invention also provides a method of decompressing video data comprising the steps of:

(i) dequantizing each of one or more primary components, each representing a range of spatial frequency content within said input video data, with a primary dequantization step width $Q_1$ and dequantizing each of a plurality of secondary components, each representing a range of spatial frequency content within said input video data, with a secondary dequantization step width $Q_2$, where $Q_1$ and $Q_2$ are substantially given by:

$$Q_1 = K_1/R(f_1) \text{ and } Q_2 = K_2/R(f_2),$$

with $R(f_s)$=relative human visual responsiveness at differing spatial frequencies $f_s$, $f_s$=spatial frequency in cycle per degree of visual angle, $f_1$=a spatial frequency representative of that primary component being quantized, $f_2$=a spatial frequency representative of that secondary component being quantized, and $K_1$ and $K_2$ are constants with $K_1 > K_2$; and (ii) frequency combining said dequantized primary components with M frequency combining stages and said dequantized secondary components with N frequency combining stages, N being greater than M.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
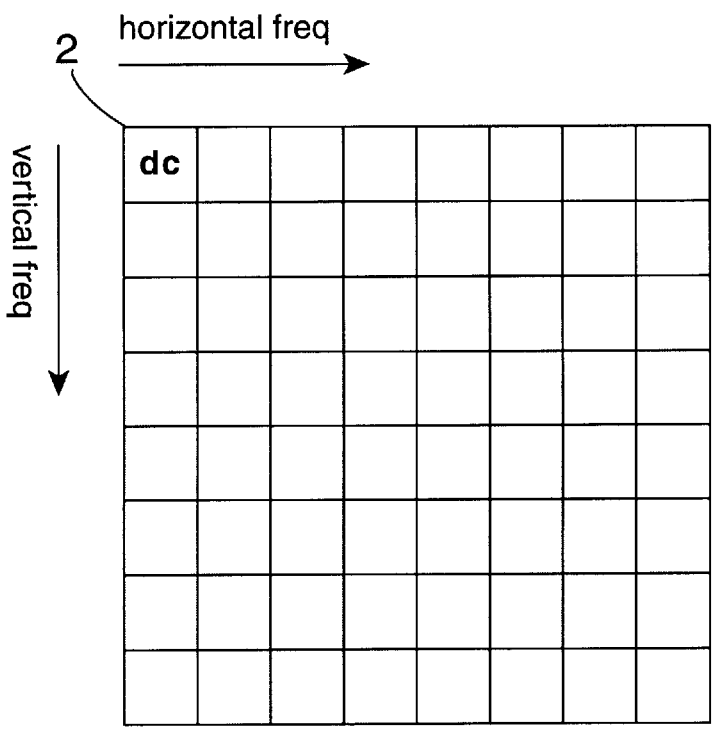
FIG. 1 illustrates an image transformed into uniform subband components in the two-dimensional spatial frequency domain.
Figure 2:
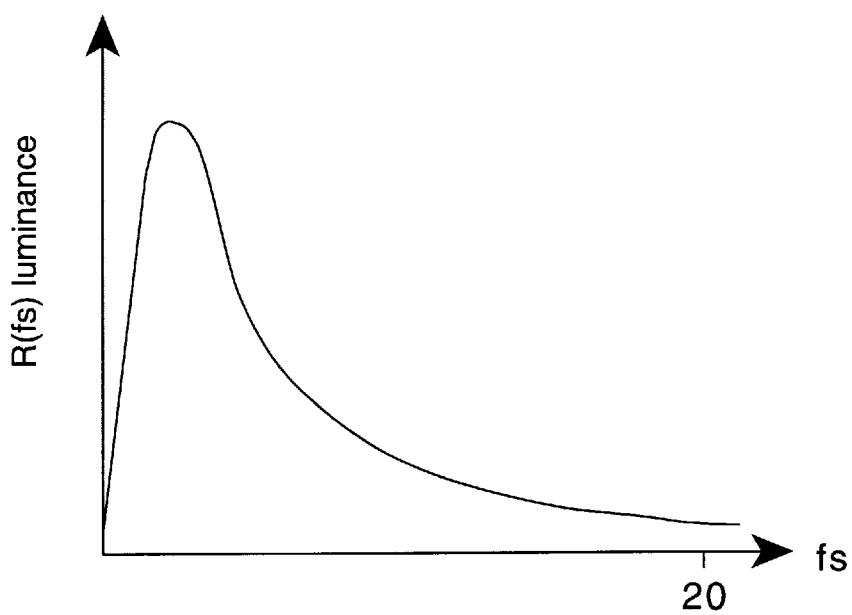
FIG. 2 illustrates the relative human visual responsiveness to luminance levels at differing spatial frequencies.

FIG. 1 illustrates an image transformed into uniform subband components in the spatial frequency domain. The image is transformed into 8*8 components. Passing rightwards or downwards within the array of components corresponds to an increase in spatial frequency. The upper leftmost component 2 corresponds to the substantially DC content of the image. Generally speaking, even without the compression process, there is more information contained in the lower frequency components than in the higher frequency components. Using the compression process further reduces the information content of the higher frequency components relative to the lower frequency components. This decorrelation is used to achieve efficient coding by subsequently applying techniques such as runlength coding and entropy coding. A system using the frequency separation technique as illustrated in FIG. 1 is described in more detail in GB-A-2 251 756. FIG. 2 illustrates the relative human visual responsiveness $R(f_s)$ to luminance at different spatial frequencies $f_s$. Spatial frequency $f_s$ is measured in cycles per degree of visual angle so as to independent of viewing distance from the video image reproduction apparatus. The relative visual responsiveness $R(f_s)$ is determined empirically using a threshold type testing procedure whereby luminance variations at a given spatial frequency are increased in magnitude until they are perceived by the viewer. The visual responsiveness to luminance curve shown in FIG. 2 can be described by the following equation:

$$R(f_s) = a*(1-e^{-b.fs})*(e^{-c.fs}+(0.33*e^{-33.c.fs}))$$

with 0.8<a<1.2, 1.4<b<1.8, and 0.3<c<0.5, and preferably a =1.0, b =1.6 and c =0.4.

Figure 3A:
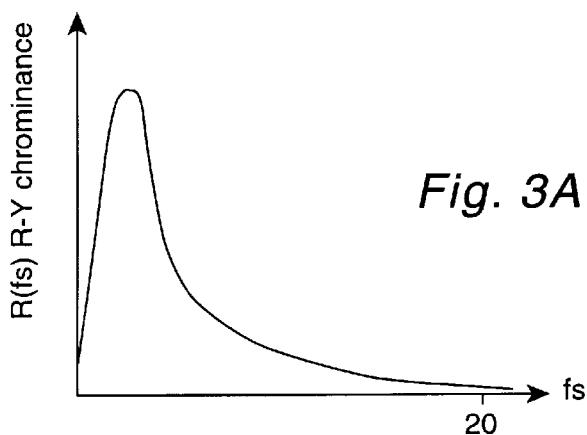
FIGS. 3A and 3B illustrate relative human visual responsiveness to R-Y and B-Y colour difference chrominance signal levels at differing spatial frequencies.
Figure 3B:
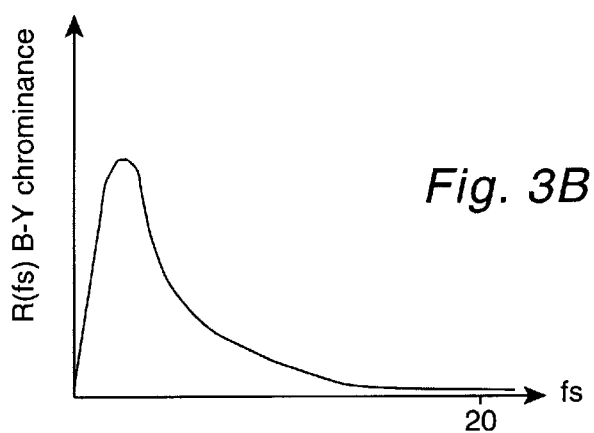

FIGS. 3A and 3B illustrates the relative human visual responsiveness $R(f_s)$ to chrominance at differing spatial frequencies in an analogous manner to FIG. 2. The chrominance signals can be B-Y or R-Y colour difference signals. It will be seen that the relative human visual responsiveness to chrominance has a sharper peak at the low spatial frequencies and more rapidly declines to zero towards the high spatial frequencies. The visual responsiveness curve for red colour difference (R-Y) chrominance video data shown in FIG. 3A can be described by the following equation:

$$R(f_s) = a*(1-e^{-b.fs})*e^{-c.fs}$$

with 1.5<a<1.9, 1.4<b<1.8, and 0.5<c<0.7, and preferably a =1.7, b =1.6 and c =0.6. The visual responsiveness curve for blue colour difference (B-Y) chrominance video data shown in FIG. 3B can be described by the above equation with 1.15<a<1.55, 1.4<b<1.8, and 0.25<c<0.45, and preferably a =1.35, b =1.6 and c =0.35.

Both FIG. 2 and FIGS. 3A and 3B illustrate the variation in relative visual responsiveness at differing spatial frequencies (given in cycles per degree of visual angle) in one dimension. A surface mapping the relative human visual responsiveness to spatial frequency in two dimensions can be obtained by rotating each of the curves of FIG. 2 and FIGS. 3A and 3B about the $R(f_s)$ axis. FIG. 3A shows the R-Y colour difference responsiveness and FIG. 3B shows the B-Y colour difference responsiveness. The magnitudes of the R-Y responsiveness are greater than those of the B-Y responsiveness in line with the empirically determined relationships discussed above.

Figure 4:
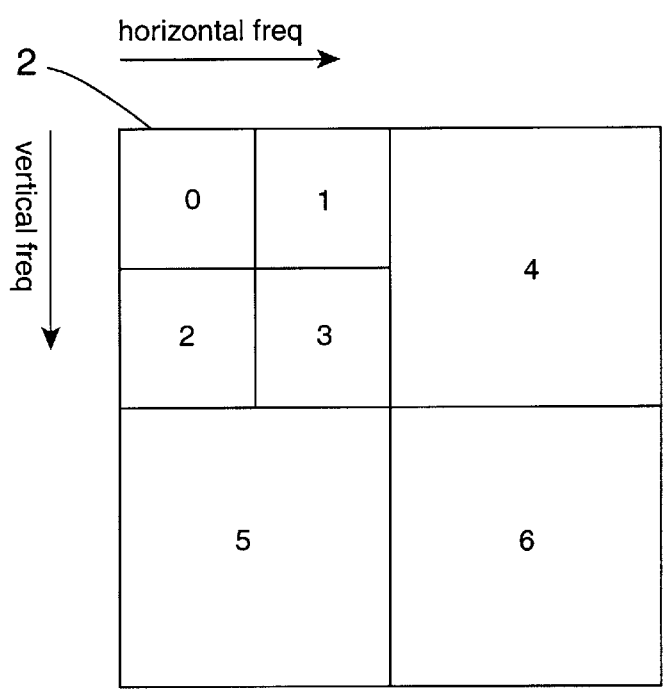
FIG. 4 illustrates an image transformed into non-uniform frequency components (wavelet coding) in the two-dimensional spatial frequency domain.

FIG. 4 illustrates an image transformed into non-uniform frequency components in the two-dimensional spatial frequency domain.

The image is transformed into three primary components (components 4, 5, 6) and four secondary components (components 0, 1, 2, 3). The component 0 corresponds to the DC subband of FIG. 1. Each of the secondary components occupies one quarter of the area in the spatial frequency domain compared to the primary components. Moving rightwards and downwards in the transformed image corresponds to an increase in spatial frequency. The primary components are subject to one stage of frequency separation and subsequently one stage of frequency combination, whereas the secondary components are subject to two stages of frequency separation and subsequently two stages of frequency combination.

Figure 5:
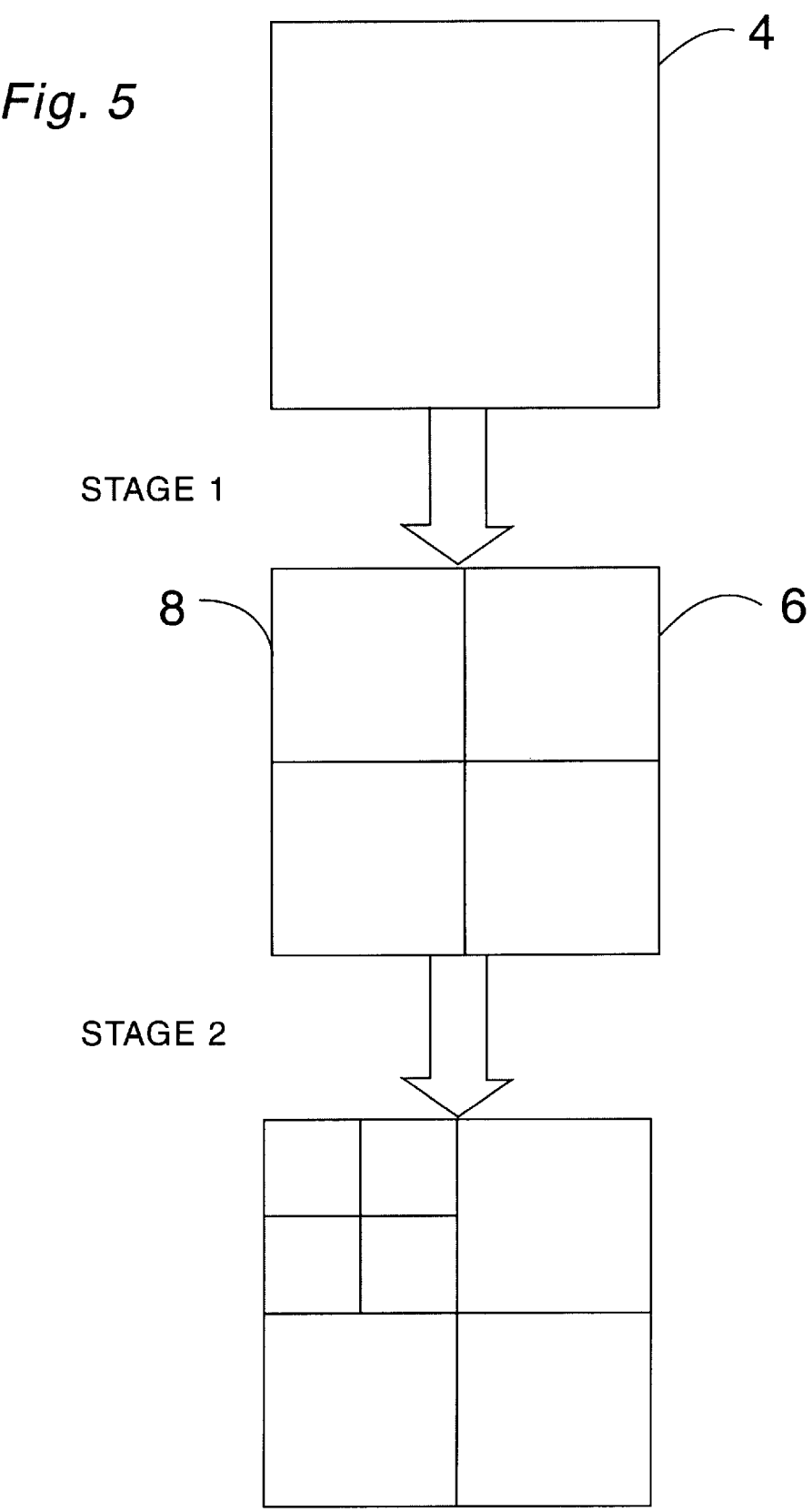
FIG. 5 illustrates a two-stage process for transforming an image into the form illustrated in FIG. 4.

FIG. 5 illustrates the stages in the frequency separation process. An image 4 in the spatial domain is first subject to complementary low and high pass filtering in both the horizontal and vertical directions to split it into four primary sub bands in the spatial frequency domain 6 (Stage 1). The lowest frequency component 8 corresponds to the DC component 2 of FIG. 1 and FIG. 2.

The lowest frequency component 8 alone is then subject to further splitting by low and high pass filters in both the horizontal and vertical directions to form four secondary components (Stage 2). The primary components (components 4, 5, 6) other than lowest frequency component 8 remain unchanged during Stage 2.

The spatial frequency separation by low and high pass filtering includes decimation of the sample data so as to maintain as constant the number of data values representing the particular content of the image in a different domain.

Figure 6:
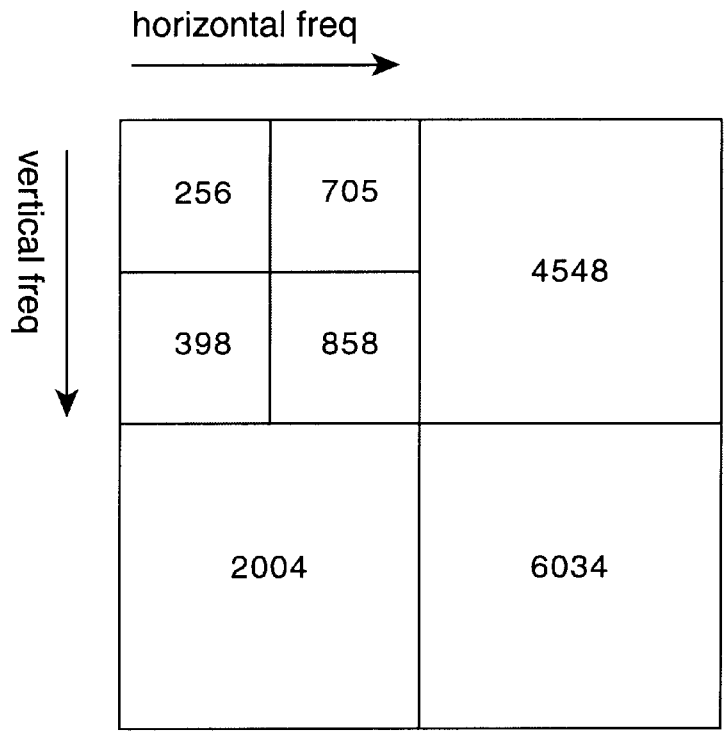
FIG. 6 shows quantization step widths as applied to the different frequency components of FIG. 4.

FIG. 6 illustrates the relative quantization step widths applied to the primary and secondary components. The quantization step widths increase as spatial frequency increases. The quantization step widths for the primary components are double those that would be used if based purely upon the relative human visual responsiveness as illustrated in FIG. 2 and FIG. 3. The quantization step widths increase less rapidly with increasing vertical spatial frequency since the image in the spatial domain is an interlaced field image rather than being a full vertical resolution frame image.

Figure 7:
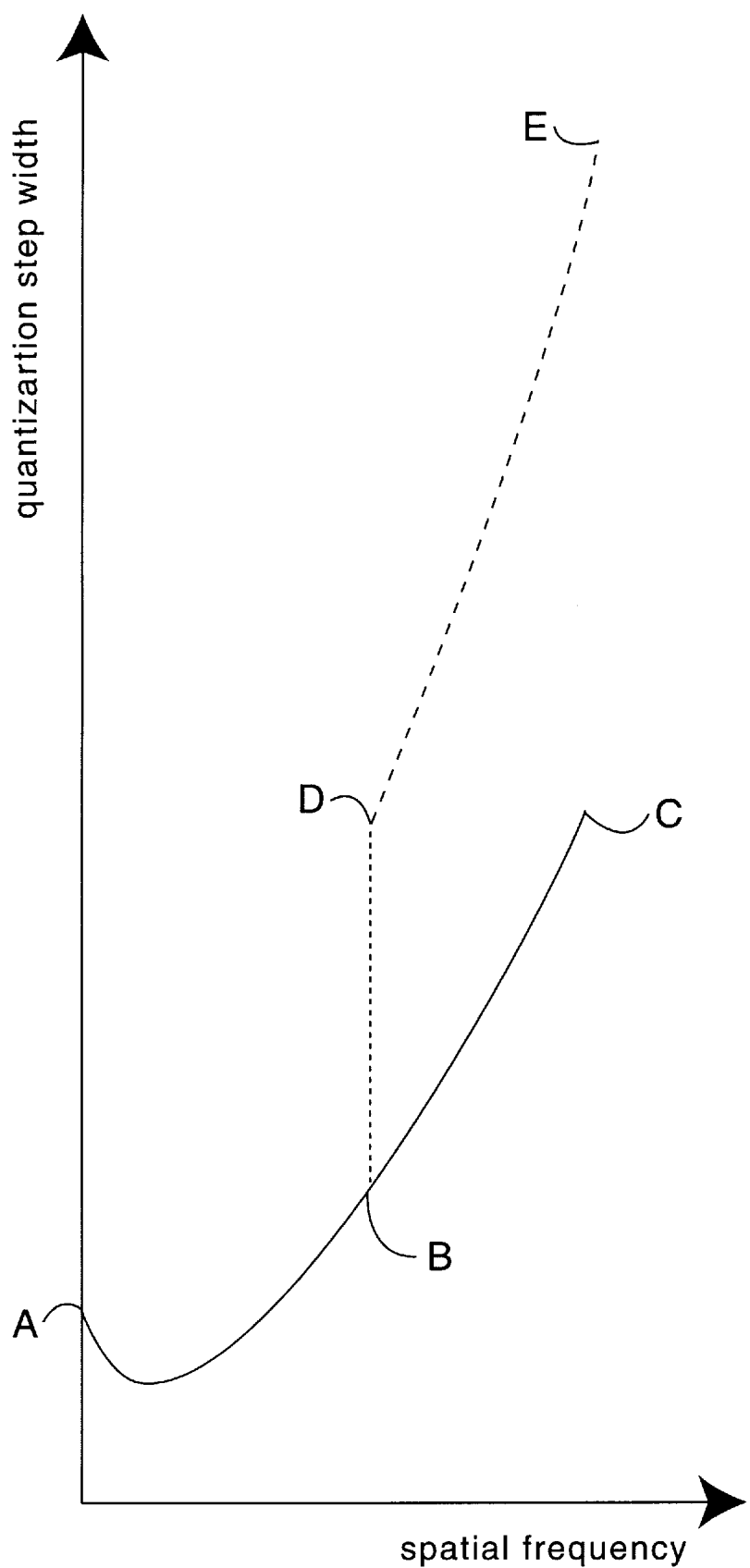
FIG. 7 illustrates the variation of quantization step width used to produce the quantization step width values of FIG. 6.

FIG. 7 illustrates the variation in quantization step width with spatial frequency as used in FIG. 6. The curve ABC represents the inverse of the curves illustrated in either FIG. 2 or FIG. 3 depending on whether it is luminance or chrominance data that is being processed. That is, a quantization step width $Q_s$ can be obtained from $Q_s=K_s/R(f_s)$ with $K_s$ being a constant reflecting the relative number of combination stages to which the frequency component $f_s$ is subjected, as described below. The curve ABC is that used to generate the quantization step widths in the system disclosed in GB-A-2 251 756. In contrast, for this embodiment of the present invention, the curve DE is used to derive the quantization step widths for the upper half of the spatial frequencies. For a given point along the curve BC, the corresponding point of the same spatial frequency along the curve DE represents double the quantization step width. There is a discontinuity at BD.

Figure 8:
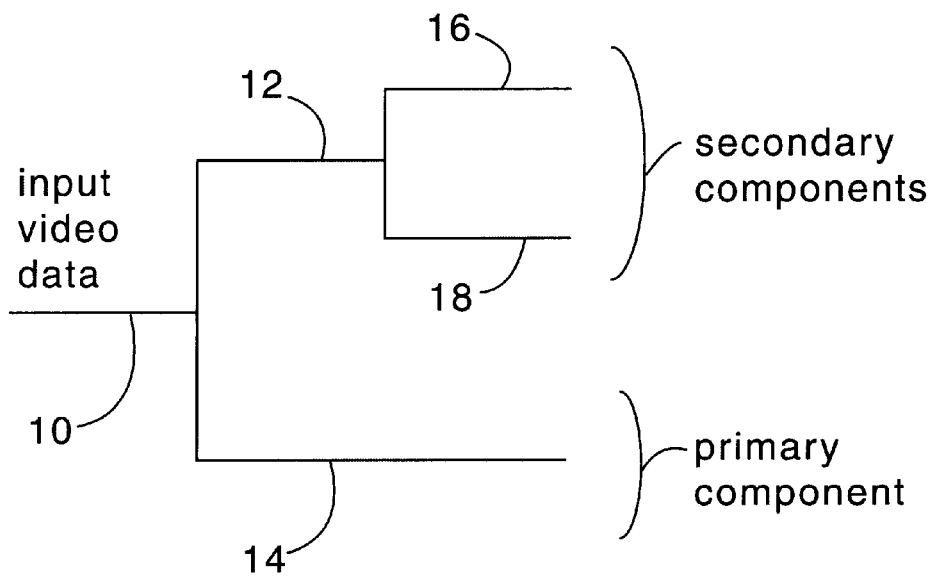
FIG. 8 illustrates a branching hierarchy of low and high pass filters for performing frequency separation into non-uniform components in one dimension.

FIG. 8 schematically illustrates a branching hierarchy of low and high pass filters that can be used to perform non-uniform frequency separation. Input video data 10 is split into a low frequency portion 12 and a high frequency portion 14 by respective low and high pass filters. These low and high frequency portions 12, 14 are decimated so as to preserve the overall data rate. The low frequency portion 12 is further split by a second stage of low and high pass filtering to produce a low frequency portion 16 and a high frequency portion 18. Once again, the low and high frequency portions 16, 18 are decimated so as to preserve the data rate. The low frequency portion 14 resulting from the first stage of frequency separation forms a primary component. The low and high frequency portions 16, 18 resulting from the second stage of frequency separation form secondary components.

The frequency splitting illustrated in FIG. 8 is in one dimension. It will be appreciated that frequency splitting in the other dimension will be achieved with another branching hierarchy of filters. The filters used are finite impulse response filters employing either sample or line delays depending upon whether horizontal or vertical filtering is required.

Figure 9:
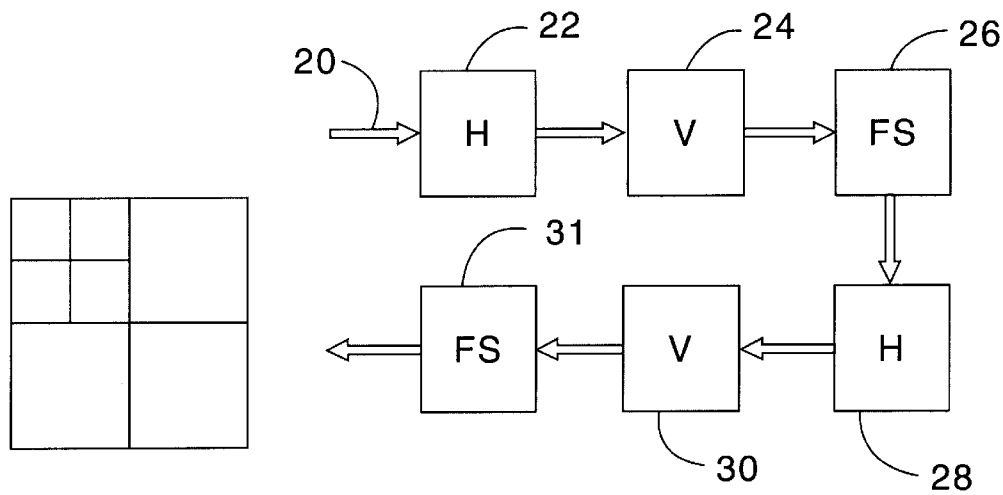
FIG. 9 illustrates one form of frequency separator.

FIG. 9 illustrates one form of the means for frequency separating. Input video data 20 is supplied to a complementary low and high pass filter arrangement 22 where it is split into two horizontal bands using finite impulse response filters with sample delays. The data thus split is then passed to another low and high pass filter arrangement 24 where it is further split into two vertical bands using finite impulse response filters with line delays. The data output from the filter arrangement 24 is sample multiplexed with interleaved high and low components as described in copending British Patent Application 9118167.7 (Sony Broadcast & Communications Limited). At this point the image is written into a field store 26 which serves to convert it from sample multiplexed form into the form illustrated after Stage 1 in FIG. 5.

The lowest horizontal and vertical frequency component from the primary components stored in the field store 26 is then subject to a second stage of horizontal and vertical frequency splitting by the high and low pass filter arrangements 28, 30. The high and low pass filter arrangements 28, 30 are disabled for the remaining primary components other than the lowest horizontal and vertical frequency primary component. The output from the filter arrangement 30 is written into the field store 31 where it is transformed from sample multiplexed form into the form illustrated after Stage 2 in FIG. 5.

Figure 10:
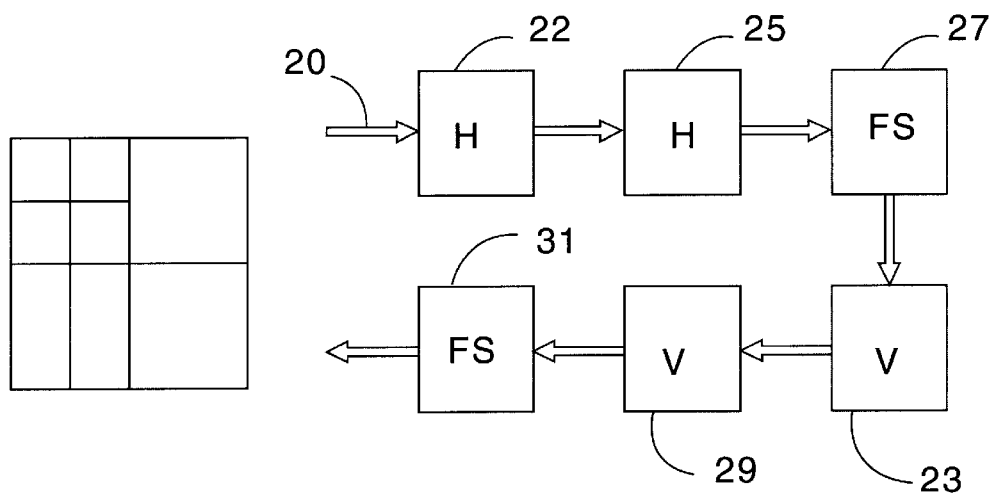
FIG. 10 illustrates another form of frequency separator.

FIG. 10 illustrates another embodiment of the means for frequency separating. In this embodiment, input data 20 is subject to a first stage of horizontal frequency separation by the filter arrangement 22 (sample delays) and then the lower horizontal frequency component alone is subject to a second stage of horizontal frequency separation by the filter arrangement 25. The data is then written into field store 27 where it is transformed from its sample multiplexed format into a format in which the differing horizontal components are separated.

The data from the field store 27 is then transposed and passed through a first stage of vertical filtering by the filter arrangement 23 (sample delays can be used since data has been transposed; this is easier to implement than having to provided the buffering necessary for line delays) and then the lower vertical frequency components alone is subject to a second stage of vertical frequency separation by the filter arrangement 29. The output from the filter arrangement 29 is then written into a field store 31 where it is rearranged into the format shown. As a consequence of both stages of horizontal filtering being performed before the vertical filtering is that the low horizontal and high vertical spatial frequency component of FIG. 9 is now split in two horizontally since at the time of the second stage of horizontal filtering there has not yet been any vertical frequency separation that could be used to avoid this extra splitting. The effective quantizing steps applied to these two areas is scaled by a factor of $2^{1/2}$ rather than 2 as a result of the extra stage of horizontal decimation. That is, for the configuration shown in FIG. 9, the primary components $f_1$ are quantized with a primary quantization step width $Q_1$, where $Q_1=K_1/R(f_1)$, the secondary components $Q_2$ are quantized with a secondary quantization step width $Q_2$, where $Q_2=K_2/R(f_2)$, and $K_1=2K_2$. For the configuration shown in FIG. 10, $K_1=K^{1/2}K_2$.

Figure 11:
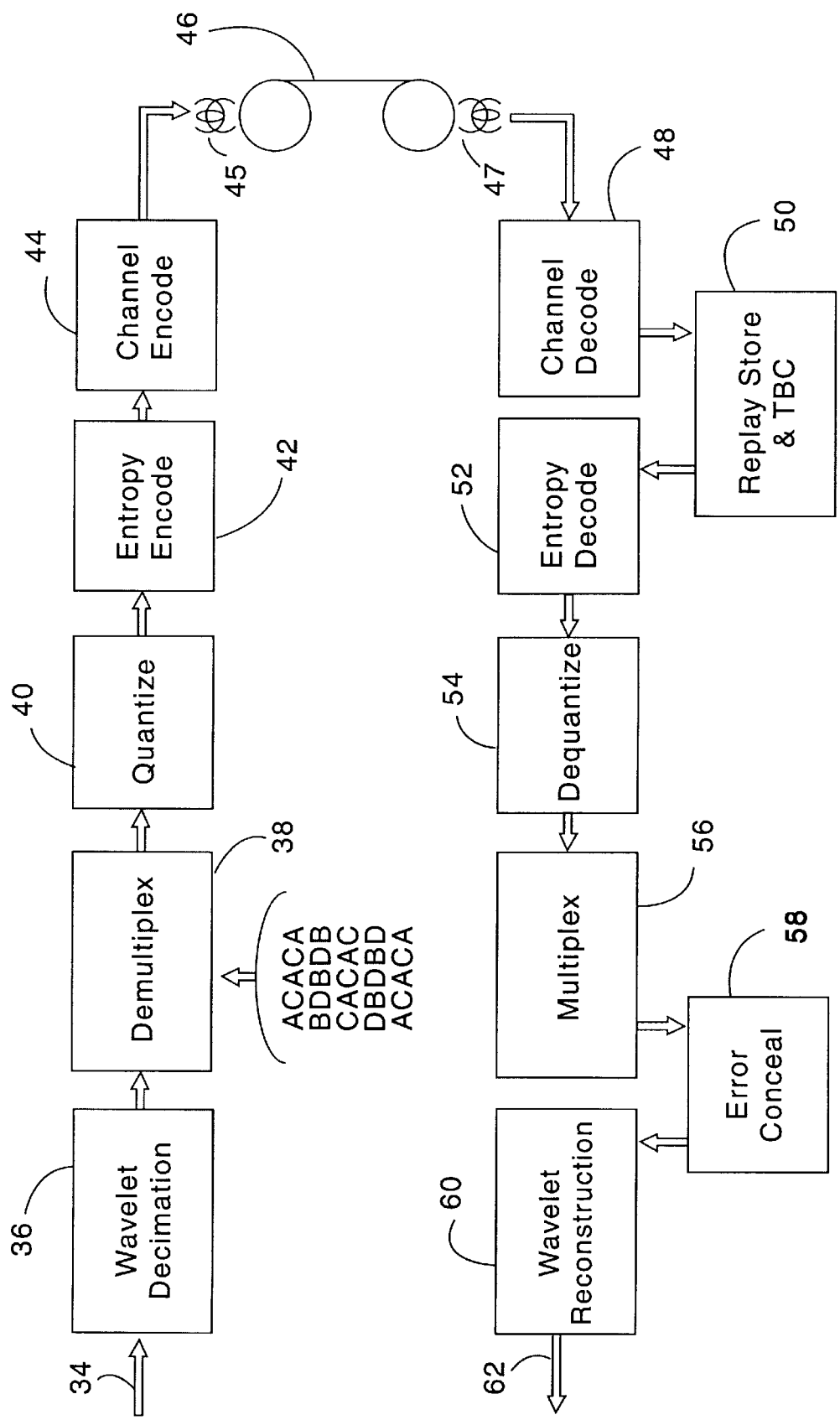
FIG. 11 illustrates a video data recording and reproducing apparatus.

FIG. 11 illustrates a recording and reproducing apparatus 32.

Input data 34 is supplied to a wavelet decimation unit 36 where it undergoes frequency separation as illustrated in FIG. 5. The frequency separated data is then demultiplexed by a demultiplexer 38 onto four separate processing channels A, B, C, D whereby adjacent samples within the array of samples are placed on differing channels as schematically illustrated below the demultiplexer 38 in FIG. 11.

The four channels of demultiplexed data A, B, C, D are then fed to a quantizer 40 where they are subject to individual channel quantization using the quantization step widths given in FIG. 6 in dependence upon which frequency component the data being processed originates from and the overall data rate required.

The quantized data is then passed to an entropy encoder 42 where it is subject to runlength and Huffman coding. The entropy encoder 42 uses different coding tables for the different frequency components.

The frequency transformed, demultiplexed, quantized and entropy encoded data is then packaged into data blocks by a channel encoder 44. These data blocks are then written by a multichannel recording head 45 via a tape transport mechanism onto a magnetic tape 46.

As an alternative to the above the DC component data may be subject to differential coding (DCPM) to improve coding efficiency.

The DC values are typically represented by 12 bit numbers. The differences are encoded as modulo $2^{12}$ values irrespective of whether they are positive or negative differences. Upon decoding the difference are added to the current 12 bit number with any carry bits being ignored. In this way a negative difference can be achieved by adding a large number that takes the total through a bit carry and returns a modulo $2^{12}$ result that is lower than the previous total. Avoiding the need to support negative differences with a sign bit or the like simplifies implementation.

Data blocks recovered from the magnetic tape 46 are read by a multichannel reproducing head 47 and supplied to a channel decoder 48 which attempts a first level of error correction and marks any data subject to error. The multichannel recording head 45 and the multichannel reproducing head 47 may be collectively referred to as a multichannel recording and reproducing head. The channel decoder then passes the data to a replay store and time base corrector 50. The replay store 30 and time based corrector 50 allows an image to be produced when only some of the data is recovered by utilising data previously written into the replay store.

The data from the replay store and time base corrector 50 is fed to an entropy decoder 52 where it is decoded in a complementary manner 35 to the encoding process applied by the entropy encoder 42. The entropy decoder 52 uses selectable decoding tables dependent upon which frequency component the data being decoded originates from.

The output from the entropy decoder 52 is fed to a dequantizer 54 which dequantizes the decoded data using a dequantization step width complementary to that applied for the frequency component being processed by the quantizer 40.

The output from the dequantizer 52 is fed to a multiplexer 56 where the four channels A, B, C, D are combined and then passed to an error concealment unit 58. The error concealment unit 58 performs error concealment upon any samples flagged as erroneous by the channel decoder 48 using a selectable strategy of interpolating replacement values from surrounding values. The strategy can be adapted in dependence upon which frequency component the error being concealed is present in.

The output from the error concealment unit is fed to wavelet reconstruction unit 60 where the data is transformed from the spatial frequency domain to the spatial domain by a complementary array of interpolation filters to the frequency separation filters in the wavelet decimation unit 36. The output 62 from the wavelength reconstruction unit is a reproduced image in the spatial domain.

Figure 12:
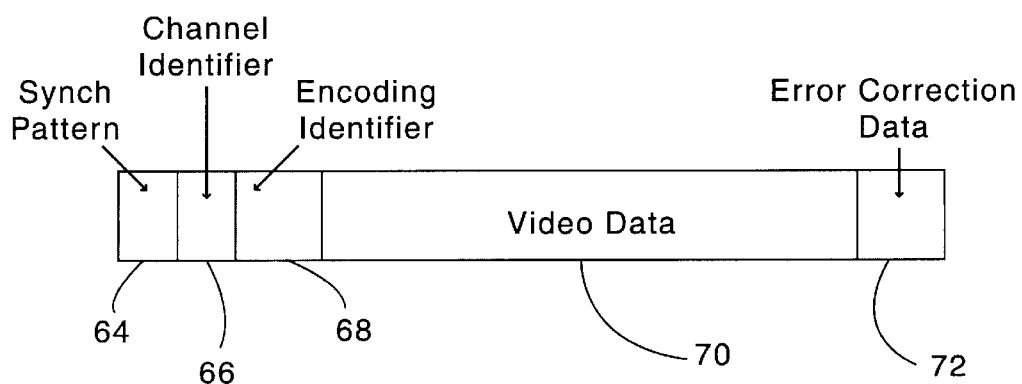
FIG. 12 illustrates a data block as recorded and reproduced by the apparatus of FIG. 11.

FIG. 12 illustrates a data block of the type into which the image data is split and recorded upon the magnetic tape 46 of FIG. 11. The data block includes a two byte fixed synchronisation pattern 64, a two byte channel identifier 66 (indicating which of channels A, B, C, D the data is from), a four byte entropy encoding identifier 68 indicating which entropy coding table was used for the following video data 70. The entropy coding identifier 68 also identifies the position of the following data in the spatial frequency domain and implicitly the quantization step width used for the following video data 70. The video data is approximately 120 bytes long and is followed by eight bytes of error correction data 72 internal to the block of FIG. 12.

The block structure of FIG. 12 allows the blocks to be independent of one another so that when only some of the data blocks are recovered (e.g. during shuttle replay) they can still be decoded and placed in the appropriate position within the replay store and time base corrector 50 of FIG. 11.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Video data compression apparatus comprising:
   means for frequency separating input video data into one or more primary components, each representing a range of spatial frequency content within said input video data, using M frequency separating stages and a plurality of secondary components, each representing a range of spatial frequency content within said input video data, using N frequency separating stages, N being greater than M; and
   a quantizer for quantizing each of said primary components with a primary quantization step width $Q_1$, and for quantizing each of said secondary components with a secondary quantization step width $Q_2$, where $Q_1$ and $Q_2$ are substantially given by:

$$Q_1 = K_1/R(f_1) \text{ and } Q_2 = K_2/R(f_2),$$

with $f_1$=a spatial frequency representative of that primary component being quantized, $R(f_1)$=relative human visual responsiveness at the spatial frequency $f_1$, $f_2$=a spatial frequency representative of that secondary component being quantized, $R(f_2)$=relative human visual responsiveness at the spatial frequency $f_2$, and $K_1$ and $K_2$ are constants with $K_1 > K_2$.

2. Video data compression apparatus as claimed in claim 1, comprising an entropy encoder for entropy encoding quantized primary and secondary component data output from said quantizer with a selectable one of a plurality of encoding tables.

3. Video data compression apparatus as claimed in claim 1, wherein said secondary components are produced by further separating one or more primary components.

4. Video data compression apparatus as claimed in claim 1, wherein
   $R(f_1)$ and $R(f_2)$ are substantially given by:

$$R(f_1) = a*(1-e^{-b \cdot f_1})*(e^{-c \cdot f_1} + (0.33*e^{-0.33 \cdot c \cdot f_1}))$$

$$R(f_2) = a*(1-e^{-b \cdot f_2})*(e^{-c \cdot f_2} + (0.33*e^{-0.33 \cdot c \cdot f_2}))$$

with $0.8 < a < 1.2$, $1.4 < b < 1.8$, and $0.3 < c < 0.5$.

5. Video data compression apparatus as claimed in claim 4, wherein said video data is luminance video data.

6. Video data compression apparatus as claimed in claim 4, wherein $a=1.0$, $b=1.6$ and $c=0.4$.

7. Video data compression apparatus as claimed in claim 1, comprising means for differentially coding DC component data using modulo additions in which carries are ignored to represent both positive and negative differences.

8. Video data compression apparatus as claimed in claim 1, wherein
   $R(f_1)$ and $R(f_2)$ are substantially given by:

$$R(f_1) = a*(1-e^{-b \cdot f_1})*e^{-c \cdot f_1}$$

$$R(f_2) = a*(1-e^{-b \cdot f_2})*e^{-c \cdot f_2}$$

with $1.15 < a < 1.55$, $1.4 < b < 1.8$, and $0.25 < c < 0.45$.

9. Video data compression apparatus as claimed in claim 8, wherein said video data is blue colour difference chrominance video data.

10. Video data compression apparatus as claimed in claim 8, wherein $a=1.35$, $b=1.6$ and $c=0.35$.

11. Video data compression apparatus as claimed in claim 1, wherein
    $R(f_1)$ and $R(f_2)$ are substantially given by:

$$R(f_1) = a*(1-e^{b \cdot f_1})*e^{-c \cdot f_1}$$

$$R(f_2) = a*(1-e^{b \cdot f_2})*e^{-c \cdot f_2}$$

with $1.5 < a < 1.9$, $1.4 < b < 1.8$, and $0.5 < c < 0.7$.

12. Video data compression apparatus as claimed in claim 11, wherein said video data is red colour difference chrominance video data.

13. Video data compression apparatus as claimed in claim 11, wherein $a=1.7$, $b=1.6$ and $c=0.6$.

14. Video data compression apparatus as claimed in claim 1, wherein $M=1$ and $N=2$.

15. Video data compression apparatus as claimed in claim 1, wherein $K_1/K_2$ is substantially equal to 2.

16. Video data compression apparatus as claimed in claim 1, wherein said means for frequency separating separates said input video data into three primary components representing a high spatial frequency portion of said video data and four secondary components representing a low spatial frequency portion of said video data.

17. Video data compression apparatus as claimed in claim 1, wherein said primary components are of a higher spatial resolution than said secondary components.

18. Video data compression apparatus as claimed in claim 17, wherein said primary components have a spatial resolution twice that of said secondary components.

19. Video data compression apparatus as claimed in claim 1, wherein said means for separating comprises a branching hierarchy of low and high pass filters.

20. Video data compression apparatus as claimed in claim 19, wherein said low and high pass filters comprise complementary finite impulse response filters.

21. Video data decompression apparatus comprising:
frequency content within said input video data, with a primary dequantization step width $Q_1$ and dequantizing each of a plurality of secondary spatial frequency components, each representing a range of spatial frequency content within said input video data, with a secondary dequantization step width $Q_2$, where $Q_1$ and $Q_2$ are substantially given by:

$$Q_1 = K_1/R(f_1) \text{ and } Q_2 = K_2/R(f_2),$$

with
$f_1$ = a spatial frequency representative of that primary component being quantized,
$R(f_1)$ = relative human visual responsiveness at the spatial frequency $f_1$,
$f_2$ = a spatial frequency representative of that secondary component being quantized,
$R(f_2)$ = relative human visual responsiveness at the spatial frequency $f_2$, and
$K_1$ and $K_2$ are constants with $K_1 > K_2$; and
means for frequency combining said dequantized primary components with M frequency combining stages and said dequantized secondary components with N frequency combining stages, N being greater than M.

22. Video data decompression apparatus as claimed in claim 21, comprising
an entropy decoder for entropy decoding compressed data into said quantized primary components and said quantized secondary components with a selectable one of a plurality of decoding tables.

23. Video data recording and reproducing apparatus, including:
video data compression apparatus comprising:
means for frequency separating input video data into one or more primary components, each representing a range of spatial frequency content within said input video data, using M frequency separating stages and a plurality of secondary components, each representing a range of spatial frequency content within said input video data, using N frequency separating stages. N being greater than M;
a demultiplexer for splitting adjacent samples within each of said primary components and said secondary components between different recording channels;
a quantizer for quantizing each of said primary components with a primary quantization step width $Q_1$, and for quantizing each of said secondary components with a secondary quantization step width $Q_2$, where $Q_1$ and $Q_2$ are substantially given by:

$$Q_1 = K_1/R(f_1) \text{ and } Q_2 = K_2/R(f_2),$$

with
$f_1$ = a spatial frequency representative of that primary component being quantized,
$R(f_1)$ = relative human visual responsiveness at the spatial frequency $f_1$,
$f_2$ = a spatial frequency representative of that secondary component being quantized,
$R(f_2)$ = relative human visual responsiveness at the spatial frequency $f_2$, and
$K_1$ and $K_2$ are constants with $K_1 > K_2 g$
multichannel recording and reproducing heads for recording the quantized primary and secondary components and for reproducing the recorded primary and secondary components; and
video data decompression apparatus comprising:
a dequantizer for dequantizing each of the reproduced Primary components with said primary dequantization step width $Q_1$ and dequantizing each of the reproduced secondary spatial frequency components with said secondary dequantization step width $Q_2$;
a multiplexer for combining samples from different reproducing channels to reform each of said primary and said secondary components; and
means for frequency combining the reformed dequantized primary components with M frequency combining stages and the reformed dequantized secondary components with N frequency combining stages, N being greater than M.

24. A method of compressing video data comprising the steps of:
frequency separating input video data into one or more primary components, each representing a range of spatial frequency content within said input video data, using M frequency separating stages and a plurality of secondary components, each representing a range of spatial frequency content within said input video data, using N frequency separating stages, N being greater than M;
quantizing each of said primary components with a primary quantization step width $Q_1$; and
quantizing each of said secondary components with a secondary quantization step width $Q_2$,
where $Q_1$ and $Q_2$ are substantially given by:

$$Q_1 = K_1/R(f_1) \text{ and } Q_2 = K_2/R(f_2),$$

with
$f_1$ = a spatial frequency representative of that primary component being quantized,
$R(f_1)$ = relative human visual responsiveness at the spatial frequency $f_1$,
$f_2$ = a spatial frequency representative of that secondary component being quantized,
$R(f_2)$ = relative human visual responsiveness at the spatial frequency $f_2$, and
$K_1$ and $K_2$ are constants with $K_1 > K_2$.

25. A method of decompressing video data comprising the steps of:
dequantizing each of one or more primary components, each representing a range of spatial frequency content within said input video data, with a primary dequantization step width $Q_1$;

dequantizing each of a plurality of secondary components, each representing a range of spatial frequency content within said input video data, with a secondary dequantization step width $Q_2$, where $Q_1$ and $Q_2$ are substantially given by:

$$Q_1 = K_1/R(f_1) \text{ and } Q_2 = K_2/R(f_2),$$

with $f_1$ = a spatial frequency representative of that primary component being quantized, $R(f_1)$ = relative human visual responsiveness at the spatial frequency $f_1$, $f_2$ = a spatial frequency representative of that secondary component being quantized, $R(f_2)$ = relative human visual responsiveness at the spatial frequency $f_2$, and $K_1$ and $K_2$ are constants with $K_1 > K_2$; and frequency combining said dequantized primary components with M frequency combining stages and said dequantized secondary components with N frequency combining stages, N being greater than M.

26. Video data recording and reproducing apparatus, including:

video data compression apparatus comprising:

means for frequency separating input video data into one or more primary components, each representing a range of spatial frequency content within said input video data, using M frequency separating stages and a plurality of secondary components, each representing a range of spatial frequency content within said input video data, using N frequency separating stages, N being greater than M; and a quantizer for quantizing each of said primary components with a primary quantization step width $Q_1$, and for quantizing each of said secondary components with a secondary quantization step width $Q_2$, where $Q_1$ and $Q_2$ are substantially given by:

$$Q_1 = K_1/R(f_1) \text{ and } Q_2 = K_2/R(f_2),$$

with $f_1$ = a spatial frequency representative of that primary component being quantized.

27. Video data recording and reproducing apparatus as claimed in claim 26, comprising a data formatter for formatting said compressed data in blocks of data each containing a header identifying a spatial frequency domain position to which compressed data within said block relates.

28. Video data recording and reproducing apparatus as claimed in claim 27, wherein each block includes error correction data for that block.

* * * * *